(12) United States Patent
Viechtbauer et al.

(10) Patent No.: US 9,410,606 B2
(45) Date of Patent: Aug. 9, 2016

(54) GEAR ARRANGEMENT

(71) Applicant: Miba Sinter Austria GmbH, Laakirchen (AT)

(72) Inventors: Martin Viechtbauer, Vorchdorf (AT); Peter Stoettinger, Vorchdorf (AT); Karl Dickinger, Vorchdorf (AT)

(73) Assignee: Miba Sinter Austria GmbH, Laakirchen (AT)

( * ) Notice: Subject to any disclaimer, the term of this patent is extended or adjusted under 35 U.S.C. 154(b) by 127 days.

(21) Appl. No.: 14/228,426

(22) Filed: Mar. 28, 2014

(65) Prior Publication Data

US 2014/0360300 A1    Dec. 11, 2014

(30) Foreign Application Priority Data

Jun. 11, 2013   (AT) .................................. 50381/2013

(51) Int. Cl.
*F16H 55/12*   (2006.01)
*F16H 55/18*   (2006.01)

(52) U.S. Cl.
CPC ........... *F16H 55/18* (2013.01); *Y10T 74/19916* (2015.01)

(58) Field of Classification Search
CPC ......... F16H 55/18; F16H 55/12; F16H 55/14; F16H 57/0006
See application file for complete search history.

(56) References Cited

U.S. PATENT DOCUMENTS

| | | | | | |
|---|---|---|---|---|---|
| 1,449,903 | A | * | 3/1923 | Leow ...................... | F16H 55/18 74/440 |
| 1,558,222 | A |   | 10/1925 | Beetow | |
| 1,619,799 | A | * | 3/1927 | Rounds ................... | F16H 55/18 74/440 |
| 4,745,823 | A | * | 5/1988 | Morita .................... | F16H 55/18 74/409 |
| 5,194,031 | A | * | 3/1993 | Sahler ..................... | A63H 31/00 446/103 |
| 5,452,622 | A | * | 9/1995 | Fenelon .................. | F16H 55/14 264/242 |
| 2006/0061666 | A1 |   | 3/2006 | Kaneko et al. | |
| 2008/0141811 | A1 | * | 6/2008 | Sandner ................... | F16H 55/18 74/434 |
| 2010/0139431 | A1 | * | 6/2010 | Park ........................ | F16H 55/18 74/409 |
| 2011/0030489 | A1 |   | 2/2011 | Chen et al. | |
| 2011/0174105 | A1 | * | 7/2011 | Meier ...................... | F16D 1/116 74/448 |

(Continued)

FOREIGN PATENT DOCUMENTS

AT    507 071 B1    2/2010
AT    508 701 B1    5/2011

(Continued)

OTHER PUBLICATIONS

Austrian Preliminary Office Action dated Mar. 4, 2014 in Austrian Application No. A 50381/2013 with English translation of relevant parts.

*Primary Examiner* — William Kelleher
*Assistant Examiner* — Jake Cook
(74) *Attorney, Agent, or Firm* — Collard & Roe, P.C.

(57) ABSTRACT

A gear arrangement has a split spur gear toothing, including a main gear and a gear rotatable relative to it in the circumferential direction, and the main gear has a hub on which the rotatable gear is mounted, and a spring element is disposed between the main gear and the rotatable gear and biases the rotatable gear in the circumferential direction towards the main gear, and a first spur gear toothing part is provided on the main gear and a second spur gear toothing part is provided on the rotatable gear. The rotatable gear is guided by at least one at least approximately annular guide web in the region of the spur gear toothing.

6 Claims, 3 Drawing Sheets

(56) References Cited

U.S. PATENT DOCUMENTS

2013/0112027 A1 5/2013 Buchleitner
2013/0213168 A1 8/2013 Buchleitner et al.

FOREIGN PATENT DOCUMENTS

AT 510 283 B1 3/2012
WO 2005/009030 A1 1/2005

* cited by examiner

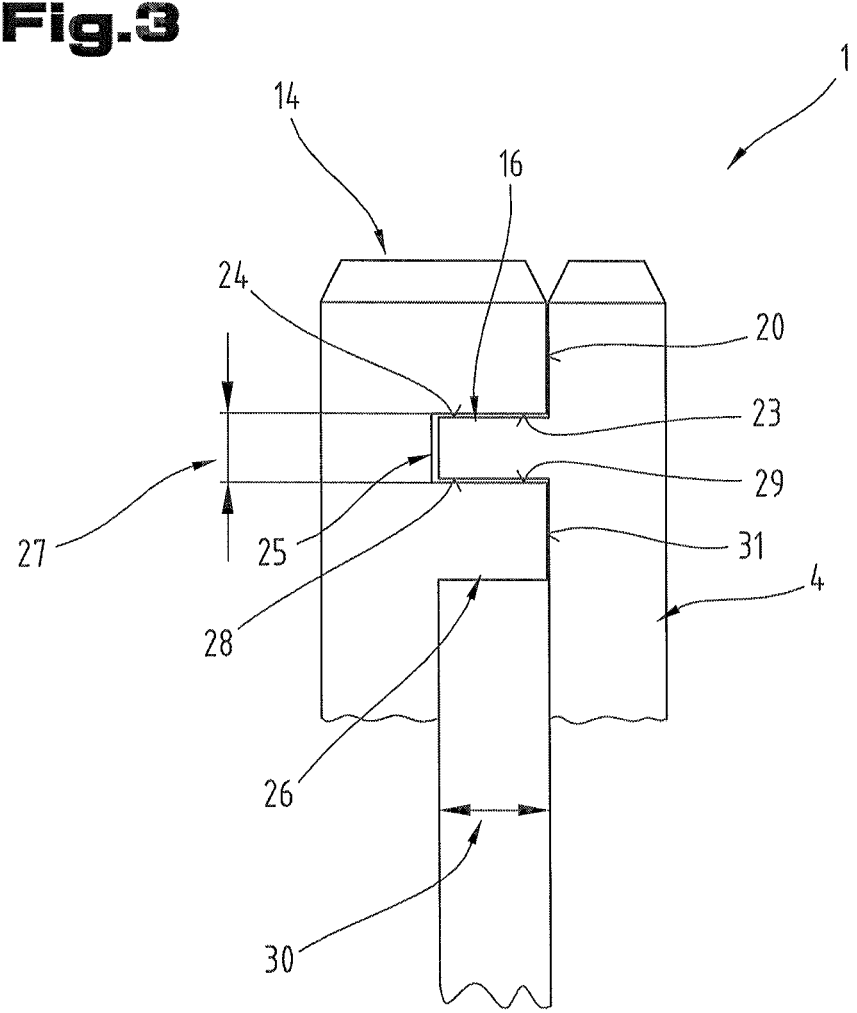

GEAR ARRANGEMENT

CROSS REFERENCE TO RELATED APPLICATIONS

Applicant claims priority under 35 U.S.C. §119 of Austrian Application No. A 50381/2013 filed on Jun. 11, 2013, the disclosure of which is incorporated by reference.

The invention relates to a gear arrangement with a split spur gear toothing, comprising a main gear and a gear which is rotatable relative to it in the circumferential direction, and the main gear has a hub on which the rotatable gear is mounted, and having a spring element which is disposed between the main gear and the rotatable gear and by means of which the rotatable gear is biased in the circumferential direction towards the main gear, and a first part of the spur gear toothing is provided on the main gear and a second part of the spur gear toothing is provided on the rotatable gear.

A gear arrangement of this type is known from WO 2005/09030 A1 filed by this applicant, for example, which comprises a gear for a no-play spur gear stage having a hub, a rim gear supported by the hub which is split along an axially normal dividing plane into two part-rims, namely into a rim part secured to the hub and a coaxially mounted rim part that is rotatable relative to it, and having an annular spring fitted around the hub which is supported by its mutually opposite ends in the circumferential direction on supporting webs overlapping in the axial direction integrally joined to the two rim parts, which are disposed one after the other in the circumferential direction of the rim gear. The rim is axially secured on the hub by means of a spring clip, for example.

Other gear arrangements of this type are known from AT 507 071 B1, AT 508 701 B1 and der AT 510 283 B1.

It has been found that such gear arrangements are subject to a relatively high degree of wear in some areas during operation under certain circumstances.

The objective of the invention is to improve a gear arrangement of the type outlined above in terms of operation.

Based on the gear arrangement outlined above, this objective is achieved due to the fact that the rotatable gear is guided by means of at least one annular guide web disposed in the region of the spur gear toothing.

The advantage of this is that by providing the outer guide for the rotatable gear on the main gear during the movement relative to the main gear, the region on the hub on the main gear on which the rotatable gear is disposed is relieved of load, as a result of which wear on this hub is reduced, thereby enabling the service life of the gear arrangement to be made longer. Providing an outer guide also makes a larger guide surface available, thereby enabling wear in the gear arrangement to be even further reduced. As a result of the larger guide surface, it is also possible to improve the acoustic behavior of the gear arrangement because the rotatable gear can be guided more effectively during the movement relative to the main gear. Any "clattering" of the gear arrangement which might occur can therefore be reduced or prevented.

At this stage, it should be pointed out that an outer guide within the context of the invention should first of all be understood as meaning that the guide surface on the rotatable gear is a surface on the main gear pointing away from the hub, pointing outwards in the radial direction, as will be explained in more detail in the description of the drawings. Irrespective of this or in addition, an outer guide within the meaning of the invention is a guide with a guide surface, and the guide surface is disposed close to the root circle of the spur gear toothing.

The expression "close to the root circle" should be understood as meaning that the distance of the guide surface from the root circle in the radial direction is at most 50% of the root circle diameter.

Based on one embodiment of the gear arrangement, the at least one annular guide web is disposed on the rotatable gear. This makes production of the guide web easier, especially if the gear arrangement is at least partially made up of sintered components. Specifically, this makes it possible to design the guide web so that it projects out beyond the toothing in the axial direction, thereby making moldability and demoldability of the sintered component easier. As a result of this design, the guide web is also more readily accessible, for example in order to calibrate it and subject the guide surface to final machining. This also means that the structural length of the gear arrangement can be made smaller in the axial direction because the guide web can be designed so that it is able to fit or locate entirely in the main gear in the axial direction.

Based on another embodiment, the at least one annular guide web may engage in an annular groove. This further improves the way the rotatable gear is guided on the main gear because the ability of the rotatable gear to move radially is restricted in two directions. This means that on the hub of the main gear, the rotatable gear can be spaced at a relatively large distance from the surface of the hub, as a result of which there is essentially no longer wear on the hub during operation of the gear arrangement. Provided the position of the rotatable gear relative to the main gear is not axially partly secured via the hub, the hub on the main gear may optionally be dispensed with altogether with this embodiment.

Another option is for the rotatable gear to be biased in the axial direction towards the main gear. As a result of this biasing action, in other words not just the axial locking of the position of the rotatable gear relative to the main gear, the contact of the guide surface of the guide web on the co-operating complementary guide surface can be improved. Furthermore, this also enables the noise of the gear arrangement to be reduced because the friction induced between the main gear and the rotatable gear by the movement of the rotatable gear relative to the main gear is damped. The "gear arrangement" system as a whole may therefore be designed with reduced dynamics, i.e. greater inertia. The axial biasing also makes it possible to design the guide web with a smaller width in the radial direction whilst nevertheless achieving a reliable guiding action of the rotatable gear on the main gear.

Another option is for the region between the hub on the main gear and the spur gear toothing on the main gear and on the rotatable gear to be designed with a frustoconical shape in at least certain regions. Although this is associated with a disadvantage insofar as the gear arrangement will be of a greater weight compared with a design that is not frustoconical but straight, this design does mean that it is possible to reduce the amount of space needed to mount the gear arrangement in the axial direction in spite of the guide web protruding in the axial direction. The disadvantage of extra weight can be counteracted by providing cutouts in the rotatable gear and/or in the main gear.

Another improvement to the way the rotatable gear is guided on the main gear can be achieved if a width of the annular guide web in the axial direction of the gear arrangement corresponds to at least a width of the second part of the spur gear toothing on the rotatable gear in the axial direction. This enables a better distribution of force in the gear arrangement to be achieved.

In order to reduce friction on the guide surfaces sliding on one another on the main gear and on the rotatable gear during the movement of the rotatable gear relative to the main gear, a coating to reduce friction may be provided on or applied to the annular guide web.

Based on another embodiment of the gear arrangement, a guide surface against which the annular guide web lies may have a bigger width in the axial direction than the annular guide web. As a result, the axial end face of the guide web does not lie on the main gear, which means that no friction occurs in this region during the movement of the rotatable gear relative to the main gear.

To provide a clearer understanding, the invention will be described in more detail below with reference to the appended drawings.

These are schematically simplified diagrams illustrating the following:

FIG. 3 is a detail of another embodiment of the gear arrangement illustrated in cross-section.

Figure 1:
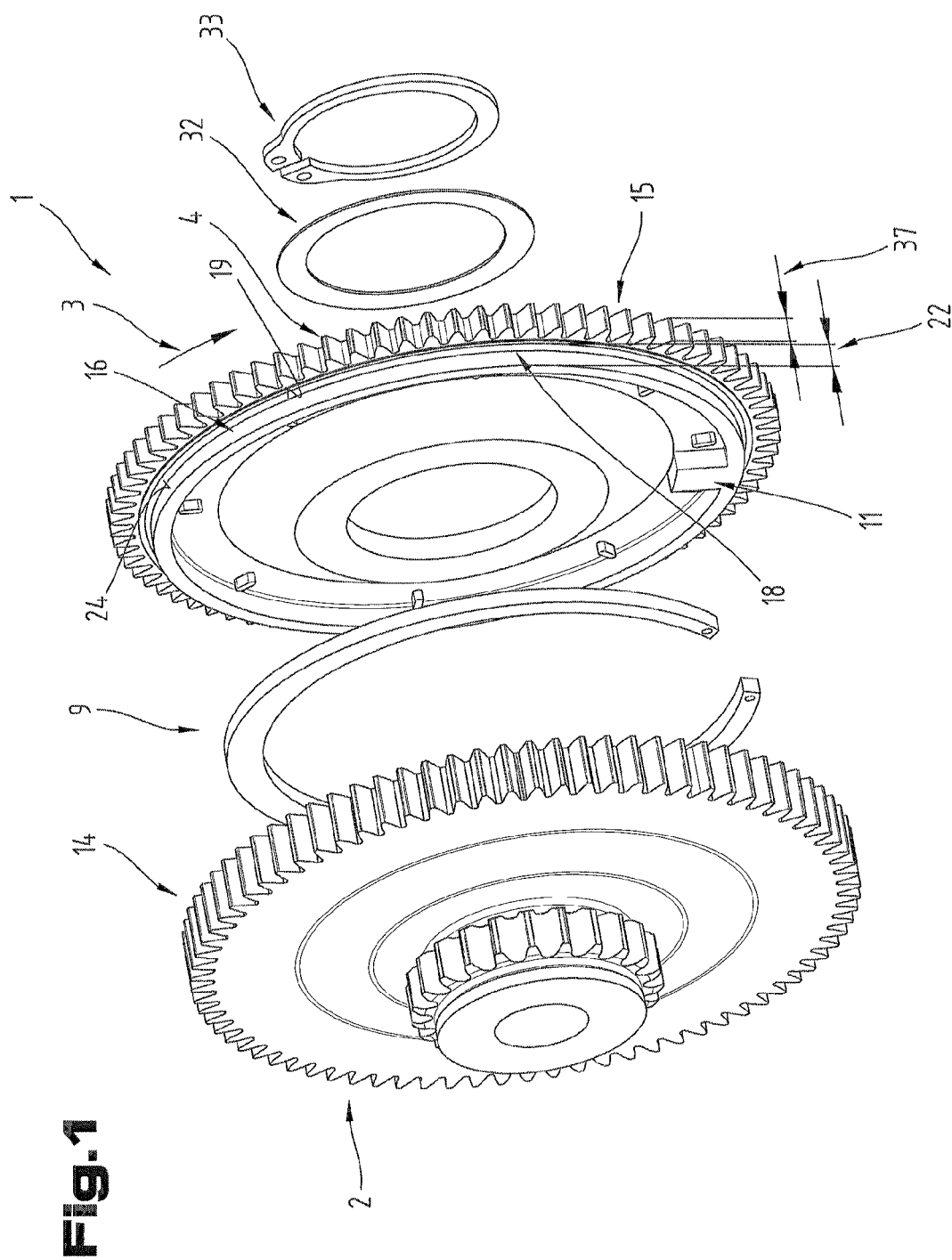
FIG. 1 is an exploded diagram viewed from an angle illustrating a first embodiment of the gear arrangement.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described.

Figure 2:
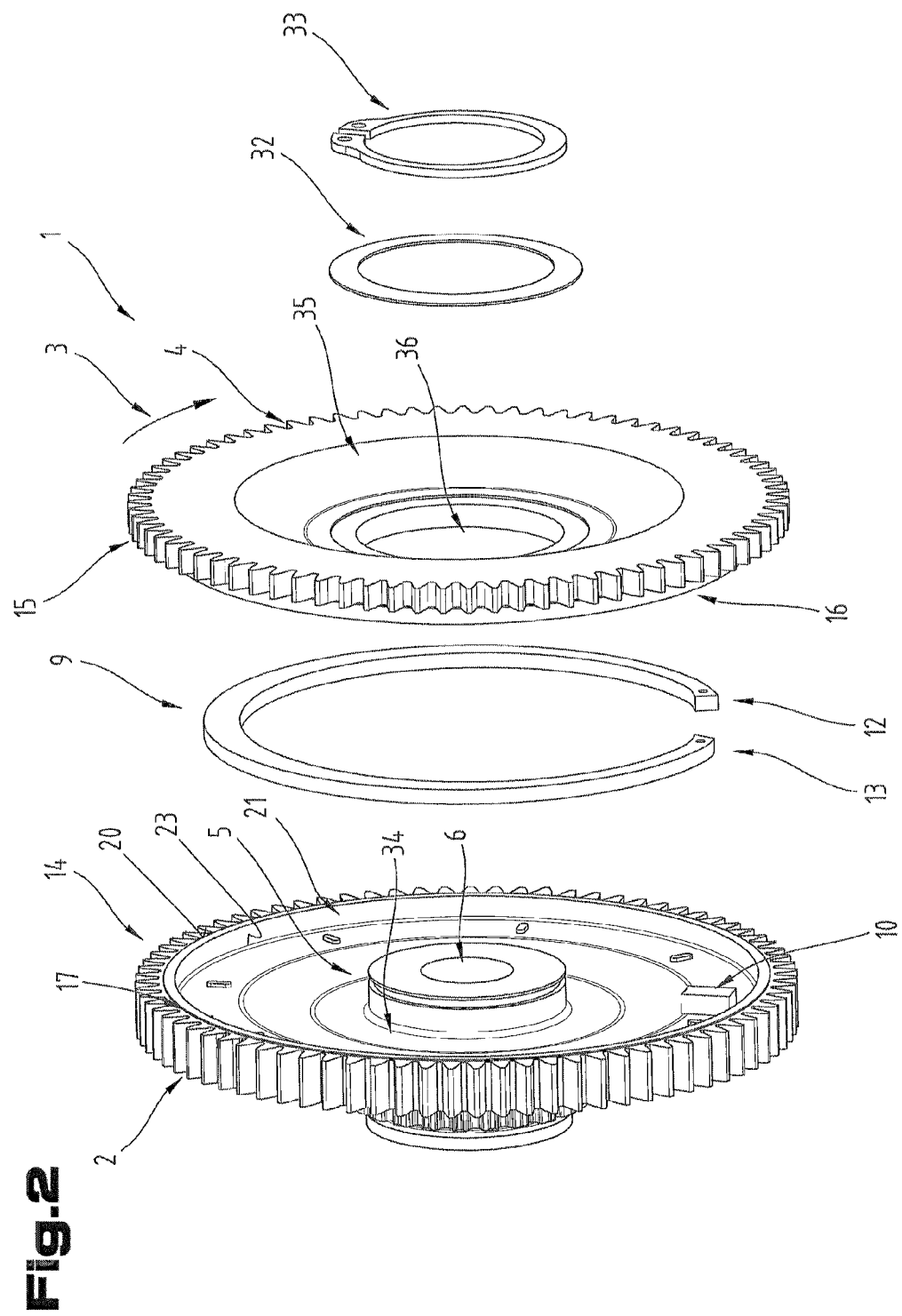
FIG. 2 is an exploded diagram viewed at an angle showing the gear arrangement illustrated in FIG. 1 from a different perspective.

FIGS. 1 and 2 are exploded diagrams illustrating a gear arrangement 1. This gear arrangement 1, also known as a "split gear", comprises a main gear 2 and a gear 4 which is rotatable relative to it in a circumferential direction 3, and the main gear 2 has a hub 5 which is specifically of an integral design with the main gear 2. The rotatable gear 4 is rotatably mounted on the hub 5 of the main gear 2.

The main gear 2 may also be described as a stationary gear insofar as it is joined to a shaft, not illustrated, relative to which it does not rotate. The term "stationary" therefore refers to non-rotation relative to this shaft but naturally does not mean that the main gear 2 does not rotate. Relative to the rotatable gear 4, however, the main gear 2 is "stationary".

To provide a mount or seating on the shaft, the hub 5 may have a cut-out 6 in the form of a central bore. Alternatively or in addition, the hub 6 may be provided at both ends—as viewed in the axial direction—with an anti-rotation lock, for example serrations on the end faces in the axial direction. It would also be possible to use other design features known from the prior art as a means of preventing rotation, for example heat shrink fittings in the form of splines, etc.

The rotatable gear 4 is biased in the circumferential direction 3 towards the main gear 2 by means of a spring element 9, which in this case is a so-called Ω spring, in a manner known from the prior art. To provide this biasing action, a support web 10 is provided on the main gear 2 and a support web 11 is provided on the rotatable gear 4. The spring element 7 lies with its two open end regions 12, 13 against these support webs 10, 11. When the gear arrangement 1 is in the assembled state, the two support webs 10, 11 lie against one another so that no gap is left between them. However, it would also be possible for the two support webs 10, 11 to be spaced apart from one another in the assembled state.

On its external circumference, the gear arrangement 1 has spur gear toothing, and a first spur gear toothing part 14 extends around the circumference of the main gear 2 and a second spur gear toothing part 15 extends around the circumference of the rotatable gear 4. The spur gear toothing is therefore split into two spur gear toothing parts 14, 15 in the axial direction.

Unlike gear arrangements known from the prior art, the rotatable gear 4 is not or not exclusively guided at the inside on the hub 2 and instead, the rotatable gear 4 is guided on the outside. In order to achieve this outer guiding action, the rotatable gear 4 is guided by means of an annular guide web 16 in the region of the spur gear toothing of the gear arrangement 1 provided on the circumference.

For a definition of the wording "in the region of the spur gear toothing", reference may be made to the explanations given above.

In the embodiment of the gear arrangement 1 illustrated in FIGS. 1 and 2, the guide web 16 is provided on the rotatable gear 4, in particular is manufactured integrally with it.

At this stage, it should be pointed out that the main gear 2 and/or the rotatable gear 4 is/are preferably made using a sintering process, in other words is/are sintered component(s).

The guide web 16 is preferably annular in shape. However, it would also be possible to opt for a design in which the guide web 16 is of an approximately annular design, i.e. the guide web 16 is made up of several circle segments, for example two, three or four, etc., which extend one after the other in the circumferential direction around the circle and in particular are disposed spaced apart from one another. In other words, the guide web 16 may comprise several segments disposed one after the other.

In addition to extending in the circumferential direction 3, the guide web 16 extends widthwise in the axial direction. If the guide web 16 is provided on the rotatable gear 4, the guide web 16 extends in the direction towards the main gear 2 and fits inside it so that the two spur gear toothing parts 14, 15 of the spur gear toothing lie at least approximately against one another when the gear arrangement 1 is in the assembled state.

By "at least approximately" is meant that due to the manufacturing process, a shoulder 17 respectively 18 might be formed on the main gear 2 and/or the rotatable gear 4 in the region of the spur gear toothing, in which case the two spur gear toothing parts 14, 15 will be spaced slightly apart from one another when the rotatable gear 4 lies with an end face 19 in the axial direction against a corresponding end face 20 in the axial direction of the main gear 2.

In order to fit the guide web 16 in the main gear 2, the latter has a shoulder 21 underneath the spur gear toothing part 14 which is at least as wide in the axial direction as a width 22 of the guide web 16 in the axial direction.

This shoulder 21 acts as a guide surface 23 against which what is an outer guide surface 24 of the guide web 16, as viewed in the radial direction, lies when the gear arrangement 1 is in the assembled state.

Both the guide surface 24 and guide surface 23 are preferably cylindrical surfaces. However, it would also be possible for the guide surface 24 and guide surface 23 to extend in a conical arrangement in the axial direction, in other words in the form of frustoconical surfaces. In the situation where the guide web 16 comprises several segments, as described above, these explanations are applicable adapted accordingly.

Given that the guide surface 23 is disposed underneath the spur gear toothing part 14 in the radial direction and the spur gear toothing part 14 preferably extends around the entire circumference of the gear arrangement 1, the guide surface 23 preferably also extends continuously in the circumferential direction 3.

The thickness of the guide web 16 in the radial direction will depend on the mechanical strength required.

Based on one embodiment of the gear arrangement 1, the guide web 16 is not disposed on the rotatable gear 4 but on the main gear 2. In this case, the guide surface 23 is provided on the rotatable gear 4. Also in this case, the guide web 16 extends in the direction towards the rotatable gear 4 as viewed in the axial direction. The explanations given above in connection with the embodiment illustrated in FIGS. 1 and 2 are applicable to this embodiment adapted accordingly.

FIG. 3 illustrates another embodiment of the gear arrangement 1 which may optionally be construed as an independent embodiment in its own right, the same reference numbers and component names being used to denote parts that are the same as those used for FIGS. 1 and 2. To avoid unnecessary repetition, reference may be made to the detailed description given above with reference to FIGS. 1 and 2.

Based on this other embodiment of the gear arrangement 1, a detail of which is illustrated in FIG. 3, it is possible for the guide web 16 to engage in an annular groove 25.

The guide web 16 may in turn be disposed on the rotatable gear 4 as described above. The groove 25 is provided on the main gear 2 underneath the spur gear toothing part 14 by forming or providing another, in particular annular, web 26 underneath the guide surface 23 and spaced at a distance apart from it. Alternatively, the web 26 may also comprise several segments disposed one after the other in the circumferential direction 3 (FIG. 1) and spaced at a distance apart from one another, as described above in connection with the guide web 16.

A height 27 of the groove 25 in the radial direction may be dimensioned so that the guide web 16 lies both with guide surface 24 against guide surface 23 and with a bottom face 28 against a wall surface 29 of the groove 25 lying opposite the guide surface 23. However, another option would be for this wall surface 29 of the groove 25 to be spaced apart from the face 28, in which case the width 27 of the groove 25 is greater than the thickness of the guide web 16 in the same direction.

Furthermore, a width 30 of the web 26 in the axial direction may be dimensioned so that an end face 31 of the web 26 pointing in the axial direction lies flush with the end face 20 disposed underneath the spur gear toothing part 14 in the same direction. However, the width 30 may also be dimensioned so that the end face 31 of the web 26 terminates before end face 20 in the axial direction so that, by contrast with the situation described above, a gap is formed between the rotatable gear 4 and the main gear 2 in the region of the web 26. This enables friction between the main gear 2 and rotatable gear 4 to be reduced.

If the guide web 16 lies in the groove 25 with both sides as described, both an outer guide and an inner guide may be formed by the guide web 16.

In this connection, it should be pointed out that the inner guide for the rotatable gear 4 on the hub 5 may be provided in addition to the outer guide described above in the case of all of the embodiments.

Again with this embodiment of the gear arrangement 1, it is possible to opt for the reverse layout, i.e. where the guide web 16 is provided on the main gear 2 and the groove 25 is provided on the rotatable gear 4. In this case, the rotatable gear 4 may also have two webs projecting in the direction towards the main gear, between which the groove 25 is formed.

It should be pointed out that it is possible, generally speaking, although this is not the preferred embodiment of the gear arrangement 1, for a plurality of guide webs 16 corresponding to the explanations given above to be provided in the main gear 2 and/or on the rotatable gear 4. In this case, the various guide webs 16 are disposed one above the other in the radial direction and spaced apart from one another in this direction.

The explanations given below may be applied to all the embodiments of the gear arrangement 1.

To enable the other rotatable gear 4 to also be biased in an axial direction towards the main gear 2, another spring element 32 may be provided, e.g. in the form of a plate spring, as illustrated in FIGS. 1 and 2. The other spring element 32 may be disposed on the hub, for example. Alternatively, the other spring element may also be disposed on the shaft on which the gear arrangement 1 can be mounted, although this is not illustrated.

In order to lock the position of the rotatable gear 4 relative to the main gear 2 in the axial direction, a locking element 33 may be provided, for example a circlip, as also illustrated in FIGS. 1 and 2. The locking element 33 may be disposed on the hub 5, for example. Alternatively, the other spring element may also be disposed on the shaft on which the gear arrangement 1 can be mounted, although this is not illustrated.

Another option is for a region 34 between the hub 5 on the main gear 2 and the spur gear toothing part 14 on the main gear 2 to be designed with a frustoconical shape, at least in certain areas.

Likewise, a region 35 between a bore 36 in the rotatable gear 4 for accommodating the hub 5 of the main gear 2 and the spur gear toothing part 15 on the rotatable gear 4 may be designed with a frustoconical shape, at least in certain areas.

These two frustoconical regions 34, 35 are inclined in the same direction so that the frustoconical region 35 on the rotatable gear 4 can be disposed inside the frustoconical region 34 on the main gear 2.

Based on another option, the width 22 of the guide web 16, which is annular in particular, in the axial direction of the gear arrangement may correspond to at least a width 37 of the second spur gear toothing part 15 on the rotatable gear 4 in the axial direction.

Alternatively, however, the width 22 of the guide web 16, which is annular in particular, may be shorter in the axial direction of the gear arrangement than the width 37 of the second spur gear toothing part 15 on the rotatable gear 4 in the axial direction.

In order to reduce friction, the specifically annular guide web 16 may be provided with a friction-reducing coating. This coating may be provided on all surfaces which sit in contact with one another and slide on one another, in other words on the guide surface 24 (FIG. 1), for example. Alternatively or in addition, this coating may also be provided on the corresponding faces of the main gear 2.

The friction-reducing coating may be a lubricating paint or a PTFE coating, etc., for example.

Furthermore, a guide surface against which the, in particular annular, guide web 16 sits, in other words the guide surface 23 on the main gear 2 in particular, may have a greater width in the axial direction than the specifically annular guide web 16.

For the sake of completeness, it should also be pointed out that the respective guide surfaces of the gear arrangement 1, in other words the guide surface 24 on the rotatable gear 4 and the guide surface 23 on the main gear 2 in particular, lie directly against one another, optionally with the friction-reducing coating in between, so that no gap is created in the region of the guide surfaces.

To enable the guide web 16 to engage in the main gear 2, the support web 10 on the main gear 2 may be spaced apart from the guide surface 23. Alternatively, the guide web 16 may be interrupted in the region of the support web 10, in which case the end faces of this cut-out in the guide web 16 are spaced apart from the support web 10, in other words a width of the cut-out in the guide web 16 is greater in the circumferential direction, namely the width of the support web 10 in the circumferential direction, to enable the rotatable gear 4 to rotate relative to the main gear. In this case, therefore, the guide web 16 is not a closed full circle. If the guide web 16 is provided on the main gear, the same applies but in reverse.

The examples of embodiments represent possible embodiments of the gear arrangement 1, and it should be pointed out at this stage that various different combinations of the individual embodiments with one another are also possible.

For the sake of good order, finally, it should be pointed out that, in order to provide a clearer understanding of the structure of the gear arrangement 1, it and its constituent parts are illustrated to a certain extent out of scale and/or on an enlarged scale and/or on a smaller scale.

LIST OF REFERENCE NUMBERS

| | |
|---|---|
| 1 | Gear arrangement |
| 2 | Main gear |
| 3 | Circumferential direction |
| 4 | Gear |
| 5 | Hub |
| 6 | Cut-out |
| 7 | |
| 8 | |
| 9 | Spring element |
| 10 | Support web |
| 11 | Support web |
| 12 | End region |
| 13 | End region |
| 14 | Spur gear toothing part |
| 15 | Spur gear toothing part |
| 16 | Guide web |
| 17 | Shoulder |
| 18 | Shoulder |
| 19 | End face |
| 20 | End face |
| 21 | Shoulder |
| 22 | Width |
| 23 | Guide surface |
| 24 | Guide surface |
| 25 | Groove |
| 26 | Web |
| 27 | Height |
| 28 | Face |
| 29 | Wall surface |
| 30 | Width |
| 31 | End face |
| 32 | Spring element |
| 33 | Locking element |
| 34 | Region |
| 35 | Region |
| 36 | Bore |
| 37 | Width |

The invention claimed is:

1. A gear arrangement with a split spur gear toothing, comprising a main gear and a gear that is rotatable relative to it in the circumferential direction, and the main gear has a hub on which the rotatable gear is directly mounted, and having a first spring element which is disposed between the main gear and the rotatable gear and by means of which the rotatable gear is biased in the circumferential direction towards the main gear, and having a second spring element biasing the rotatable gear against the main gear in the axial direction, and a first spur gear toothing part is provided on the main gear and a second spur gear toothing part is provided on the rotatable gear, wherein the rotatable gear is guided by means of at least one annular guide web provided in the region of the split spur gear toothing.

2. The gear arrangement according to claim 1, wherein the at least one annular guide web is disposed on the rotatable gear.

3. The gear arrangement according to claim 1, wherein the at least one annular guide web engages in an annular groove and forms an inner guide for the rotatable gear on the hub and an outer guide.

4. The gear arrangement according to claim 1, wherein a first region between the hub on the main gear and the spur gear toothing on the main gear is frustoconical in shape, and a second region on the rotatable gear is frustoconical in shape.

5. The gear arrangement according to claim 1, wherein a width of the at least one annular guide web in the axial direction of the gear arrangement corresponds to at least a width of the second spur gear toothing part on the rotatable gear in the axial direction.

6. The gear arrangement according to claim 1, wherein a guide surface against which the at least one annular guide web lies has a greater width in the axial direction than the at least one annular guide web.

* * * * *